United States Patent
Berry

(10) Patent No.: US 11,372,920 B2
(45) Date of Patent: Jun. 28, 2022

(54) GENERATING RELATIONAL CHARTS WITH ACCESSIBILITY FOR VISUALLY-IMPAIRED USERS

(71) Applicant: ServiceNow, Inc., Santa Clara, CA (US)

(72) Inventor: Thomas James Berry, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/007,923

(22) Filed: Aug. 31, 2020

(65) Prior Publication Data

US 2022/0067098 A1    Mar. 3, 2022

(51) Int. Cl.
    *G06F 16/901* (2019.01)
    *G06F 16/28* (2019.01)
    (Continued)

(52) U.S. Cl.
    CPC ........ *G06F 16/9024* (2019.01); *G06F 16/284* (2019.01); *G06F 16/86* (2019.01);
    (Continued)

(58) Field of Classification Search
    CPC ...... G06F 16/958; G06F 16/284; G06F 16/86; G06F 16/9577; G09B 21/001
    (Continued)

(56) References Cited

U.S. PATENT DOCUMENTS

| | | |
|---|---|---|
| 4,941,084 A | 7/1990 | Terada et al. |
| 5,185,860 A | 2/1993 | Wu |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Accessibility Overview, https://chromium.googlesource.com/chromium/src.git/+/master/docs/accessibility/overview.md, downloaded Aug. 31, 2020, 9 pages.

(Continued)

*Primary Examiner* — Kuen S Lu
(74) *Attorney, Agent, or Firm* — McDonnell Boehnen Hulbert & Berghoff LLP

(57) ABSTRACT

An embodiment may involve data values and metadata defining a relational chart, wherein the relational chart includes one or more symbols, and wherein the symbols each contain a respective plurality of symbol segments. The embodiment may further involve one or more processors configured to: receive a request for the relational chart; generate markup language representing the relational chart, wherein generating the markup language involves, for each respective symbol of the one or more symbols: (i) generating a block of the markup language representing the respective symbol, wherein the block includes a unit of the metadata that defines a label for the respective symbol, and (ii) based on the data values, generating sub-blocks of the markup language that are embedded within the block, wherein the sub-blocks represent symbol segments of the respective symbol; and transmit the markup language representing the relational chart.

15 Claims, 12 Drawing Sheets

(51) Int. Cl.
*G06F 16/84* (2019.01)
*G06F 16/957* (2019.01)
*G06F 16/958* (2019.01)
*G09B 21/00* (2006.01)

(52) U.S. Cl.
CPC ........ *G06F 16/958* (2019.01); *G06F 16/9577* (2019.01); *G09B 21/001* (2013.01)

(58) Field of Classification Search
USPC .......................................................... 707/798
See application file for complete search history.

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0177443 A1* | 9/2003 | Schnelle ................. G06F 16/86 715/227 |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0245238 A1* | 10/2007 | Fugitt ................... G06F 3/0481 715/700 |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0208785 A1* | 8/2008 | Trefler ................... H04L 67/34 706/47 |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2011/0161375 A1* | 6/2011 | Tedder ................. G06F 16/958 707/803 |
| 2020/0319901 A1* | 10/2020 | Gupta .................. G09B 21/005 |

FOREIGN PATENT DOCUMENTS

| | | |
|---|---|---|
| WO | 99/34285 | 7/1999 |
| WO | WO 00/52559 | 9/2000 |
| WO | WO 01/79970 | 10/2001 |

OTHER PUBLICATIONS

Accessible Rich Internet Applications (WAI-ARIA) 1.1, https://www.w3.org/TR/wai-aria/#aria-label, Dec. 2017, 240 pages.

Screen Reader, https://en.wikipedia.org/wiki/Screen_reader, May 2020, 5 pages.

Understanding How Screen Readers Work [Video], https://www.angelo.edu/content/blogs/13-understanding-how-screen-readers-work-video, Dec. 6, 2017, 2 pages.

(56) References Cited

OTHER PUBLICATIONS

Microsoft Active Accessibility, https://en.wikipedia.org/wiki/Microsoft_Active_Accessibility, Apr. 2020, 7 pages.

DOM Living Standard, https://web.archive.org/web/20200714064718/https://dom.spec.whatwg.org/, Jun. 2020, 133 pages.

DOM (Document Object Model), https://developer.mozilla.org/en-US/docs/Glossary/DOM, Apr. 2020, 2 pages.

Introduction to the DOM, https://web.archive.org/web/20200717081606/https://developer.mozilla.org/en-US/docs/Web/API/Document_Object_Model/Introduction, Jan. 2020, 13 pages.

XML—Documents, https://www.tutorialspoint.com/XML/xml_documents.htm#:~:text=An%20XML%20document%20is%20a,contains%20wide%20variety%20of%20data., downloaded Aug. 31, 2020, 2 pages.

ServiceNow Accessibility Conformance Report, Orlando Release Notes, Feb. 20, 2020, 137 pages.

\* cited by examiner

```
1  <?xml version="1.0" encoding="utf-8"?>
2  <?xml-stylesheet type="text/css" href="test.css"?>
3  <svg viewBox="0 0 1000 1000" xmlns="http://www.w3.org/2000/svg">
4    <g data-z-index="999" role="region" aria-label="Admin, bar series 1 of 3 with 5 bars.">
5      <rect x="50" y="100" width="50" height="25" style="fill:rgb(255,0,0);" role="img" aria-label="1. Admin, 25, (16.67%)"/>
6      <rect x="150" y="215" width="50" height="25" style="fill:rgb(255,0,0);" role="img" aria-label="1. Admin, 25, (71.43%)"/>
7      <rect x="250" y="170" width="50" height="25" style="fill:rgb(255,0,0);" role="img" aria-label="1. Admin, 25, (31.25%)"/>
8      <rect x="350" y="190" width="50" height="50" style="fill:rgb(255,0,0);" role="img" aria-label="1. Admin, 50, (83.33%)"/>
9      <rect x="450" y="235" width="50" height="5" style="fill:rgb(255,0,0);" role="img" aria-label="1. Admin, 5, (33.33%)"/>
10   </g>
11   <g data-z-index="999" role="region" aria-label="Planned, bar series 2 of 3 with 5 bars.">
12     <rect x="50" y="125" width="50" height="100" style="fill:rgb(0,255,0);" role="img" aria-label="2. Planned, 100, (66.67%)."/>
13     <rect x="150" y="240" width="50" height="5"   style="fill:rgb(0,255,0);" role="img" aria-label="2. Planned, 5, (14.28%)."/>
14     <rect x="250" y="195" width="50" height="50" style="fill:rgb(0,255,0);" role="img" aria-label="2. Planned, 50, (62.50%)."/>
15     <rect x="350" y="240" width="50" height="5"  style="fill:rgb(0,255,0);" role="img" aria-label="2. Planned, 5, (8.33%)."/>
16     <rect x="450" y="240" width="50" height="5"  style="fill:rgb(0,255,0);" role="img" aria-label="2. Planned, 5, (33.33%)."/>
17   </g>
18   <g data-z-index="999" role="region" aria-label="Unplanned, bar series 3 of 3 with 5 bars.">
19     <rect x="50" y="225" width="50" height="25" style="fill:rgb(0,0,255);" role="img" aria-label="3. Unplanned, 25, (16.67%)."/>
20     <rect x="150" y="245" width="50" height="5" style="fill:rgb(0,0,255);" role="img" aria-label="3. Unplanned, 5, (14.28%)."/>
21     <rect x="250" y="245" width="50" height="5" style="fill:rgb(0,0,255);" role="img" aria-label="3. Unplanned, 5, (6.25%)."/>
22     <rect x="350" y="245" width="50" height="5" style="fill:rgb(0,0,255);" role="img" aria-label="3. Unplanned, 5, (8.33%)."/>
23     <rect x="450" y="245" width="50" height="5" style="fill:rgb(0,0,255);" role="img" aria-label="3. Unplanned, 5, (33.33%)."/>
24   </g>
25   <g data-z-index="999" role="region" aria-hidden="true">
26     <rect x="25" y="250" width="500" height="2" style="fill:rgb(0,0,0);" role="img"/>
27     <text x="45"  y="275">Dawn B.</text>
28     <text x="150" y="275">Tom B.</text>
29     <text x="252" y="275">Beth L.</text>
30     <text x="350" y="275">Tony M.</text>
31     <text x="450" y="275">Julie S.</text>
32   </g>
33 </svg>
```

FIG. 8

```
 1  <?xml version="1.0" encoding="utf-8"?>
 2  <?xml-stylesheet type="text/css" href="test.css"?>
 3  <svg viewBox="0 0 1000 1000" xmlns="http://www.w3.org/2000/svg">
 4    <g data-z-index="999" role="region" aria-label="Dawn B., Total = 150 (100%).">
 5      <rect x="50" y="100" width="25" height="50" style="fill:rgb(255,0,0);" role="img" aria-label="1. Admin, 25, (16.67%)"/>
 6      <rect x="50" y="50" width="125" height="100" style="fill:rgb(0,255,0);" role="img" aria-label="2. Planned, 100, (66.67%)."/>
 7      <rect x="50" y="225" width="25" height="50" style="fill:rgb(0,0,255);" role="img" aria-label="3. Unplanned, 25, (16.67%)."/>
 8    </g>
 9    <g data-z-index="999" role="region" aria-label="Tom B., Total = 35 (100%).">
10      <rect x="150" y="215" width="25" height="50" style="fill:rgb(255,0,0);" role="img" aria-label="1. Admin, 25, (71.43%)"/>
11      <rect x="150" y="240" width="50" height="5" style="fill:rgb(0,255,0);" role="img" aria-label="2. Planned, 5, (14.28%)."/>
12      <rect x="150" y="245" width="50" height="5" style="fill:rgb(0,0,255);" role="img" aria-label="3. Unplanned, 5, (14.28%)."/>
13    </g>
14    <g data-z-index="999" role="region" aria-label="Beth L., Total = 80 (100%).">
15      <rect x="250" y="170" width="25" height="50" style="fill:rgb(255,0,0);" role="img" aria-label="1. Admin, 25, (31.25%)"/>
16      <rect x="250" y="195" width="50" height="50" style="fill:rgb(0,255,0);" role="img" aria-label="2. Planned, 50, (62.50%)."/>
17      <rect x="250" y="245" width="50" height="5" style="fill:rgb(0,0,255);" role="img" aria-label="3. Unplanned, 5, (6.25%)."/>
18    </g>
19    <g data-z-index="999" role="region" aria-label="Tony M., Total = 60 (100%).">
20      <rect x="350" y="190" width="50" height="50" style="fill:rgb(255,0,0);" role="img" aria-label="1. Admin, 50, (83.33%)"/>
21      <rect x="350" y="240" width="50" height="5" style="fill:rgb(0,255,0);" role="img" aria-label="2. Planned, 5, (8.33%)."/>
22      <rect x="350" y="245" width="50" height="5" style="fill:rgb(0,0,255);" role="img" aria-label="3. Unplanned, 5, (8.33%)."/>
23    </g>
24    <g data-z-index="999" role="region" aria-label="Julie S., Total = 15 (100%).">
25      <rect x="450" y="235" width="50" height="5" style="fill:rgb(255,0,0);" role="img" aria-label="1. Admin, 5, (33.33%)"/>
26      <rect x="450" y="240" width="50" height="5" style="fill:rgb(0,255,0);" role="img" aria-label="2. Planned, 5, (33.33%)."/>
27      <rect x="450" y="245" width="50" height="5" style="fill:rgb(0,0,255);" role="img" aria-label="3. Unplanned, 5, (33.33%)."/>
28    </g>
29    <g data-z-index="999" role="region" aria-hidden="true">
30      <rect x="25" y="250" width="500" height="2" style="fill:rgb(0,0,0);" role="img"/>
31      <text x="45" y="275">Dawn B.</text>
32      <text x="150" y="275">Tom B.</text>
33      <text x="252" y="275">Beth L.</text>
34      <text x="350" y="275">Tony M.</text>
35      <text x="450" y="275">Julie S.</text>
36    </g>
37  </svg>
```

FIG. 9

GENERATING RELATIONAL CHARTS WITH ACCESSIBILITY FOR VISUALLY-IMPAIRED USERS

BACKGROUND

Computers have considerably improved the ease of data visualization. Generally, stored data can be organized and displayed into a variety of plots, graphs, or charts that may summarize the data more efficiently than a presentation of the data itself in a raw form. Relational charts, for instance, may display trends and facilitate comparison among stored data values. For example, a bar chart is a type of relational chart that can be utilized as a data visualization technique and uses rectangular bars with sizes proportional to the relative values of the data that they represent. Thus, bar charts facilitate rapid visual comparison of multiple points or sets of data. In some user interfaces, metadata related to each bar, or the chart as a whole, also can be displayed or accessed by hovering over or clicking on corresponding sections of the chart (e.g., the bars of a bar chart). This metadata may represent the underlying data used to form these sections as well as other information, and provides the user with the ability focus on data of interest. Other types of relational charts include, but are not limited to, pie charts and line charts.

Due to the visual nature of relational charts, they may be effectively inaccessible to users who are visually impaired. Typically, such users employ screen reader software when navigating through a user interface. Such a screen reader may provide an audible reading and/or audible cues related to elements of the user interface. For web-based user interfaces, this may involve the screen reader navigating the associated document object model (DOM) of a web page. If this DOM is not organized in a fashion that is logical and hierarchical, the screen reader may have difficulty conveying the various user interface elements to the user in an understandable fashion. In the case of relational charts, a screen reader may read the elements of such a chart in an order that fails to logically group together related information. Consequentially, visually-impaired users may have difficulty attaining a reasonable comprehension of the data displayed in relational charts.

SUMMARY

In order to overcome these and possibly other deficiencies, the hierarchical structure through which this data is represented should be organized in a logical fashion and contain metadata in sufficient detail in order for visually-impaired users to attain a reasonable understanding of the data presented by way of a screen reader. As noted, this hierarchical structure may comprise a DOM, and may be partially or completely generated from data retrieved from a database. Users may interact with a visual representation of the hierarchical structure through a user interface.

In the case of bar charts, for example, data retrieved from a database may correspond to visible bars of various sizes presented in a graphical user interface. Headings and other information from a database may additionally be incorporated into bar charts to represent the title, sub-title, axes labels, details of each bar and bar segment, and other metadata. However, such data and metadata presented in the bar chart may also be determined and derived from other sources, for instance, within a client-side or server-side script.

The embodiments herein relate to methods of organizing data and metadata representing bar charts into a hierarchical structure. Such methods may accompany or replace existing methods and result in improved accessibility of user interfaces for the visually impaired using screen readers. In conjunction with or as modifications to current techniques, such methods may improve the user comprehension of data displayed in the form of relational charts, reduce cognitive load, and enhance the overall user experience.

Further, organization of the hierarchical structure through such methods may provide more straightforward access to data and comparisons of data as a part of a natural language understanding (NLU) interface. In particular, a query from a voice input mechanism may induce a screen reader or other software to scan the hierarchical structure relevant to the bar chart for data or metadata. Subsequent the analysis, the screen reader may output a response corresponding to the initial query. By organizing the data and metadata as discussed herein the ability to provide relevant responses to such queries can be improved.

Accordingly, a first example embodiment may involve persistent storage containing data values and metadata defining a relational chart, wherein the relational chart includes one or more symbols and wherein the symbols each contain a respective plurality of symbol segments. The first example embodiment may further involve one or more processors configured to: receive, from a client device, a request for the relational chart; possibly in response to the request, generate markup language representing the relational chart, wherein generating the markup language involves, for each respective symbol of the one or more symbols: (i) generating a block of the markup language representing the respective symbol, wherein the block includes a unit of the metadata that defines a label for the respective symbol, and (ii) based on the data values, generating sub-blocks of the markup language that are embedded within the block, wherein the sub-blocks represent symbol segments of the respective symbol, and wherein each of the sub-blocks is associated with one or more units of the metadata that define one or more dimensions of a corresponding symbol segment of the symbol segments; and transmit, to the client device, the markup language representing the relational chart.

A second example embodiment may involve receiving, from a client device, a request for a relational chart, wherein persistent storage contains data values and metadata defining the relational chart, wherein the relational chart includes one or more symbols, and wherein the symbols each contain a respective plurality of symbol segments. The second example embodiment may also involve, possibly in response to the request, generating markup language representing the relational chart, wherein generating the markup language involves, for each respective symbol of the one or more symbols: (i) generating a block of the markup language representing the respective symbol, wherein the block includes a unit of metadata that defines a label for the respective symbol, and (ii) based on data values, generating sub-blocks of the markup language that are embedded within the block, wherein the sub-blocks represent symbol segments of the respective symbol, and wherein each of the sub-blocks is associated with one or more units of the metadata that define one or more dimensions of a corresponding symbol segment of the symbol segments. The second example embodiment may also involve transmitting, to the client device, the markup language representing the relational chart.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts an example segment of XML code that defines a bar chart organized horizontally per-bar, in accordance with example embodiments.

FIG. 9 depicts a further example segment of XML code that defines a bar chart organized vertically per-bar, in accordance with example embodiments.

DETAILED DESCRIPTION

Figure 1:
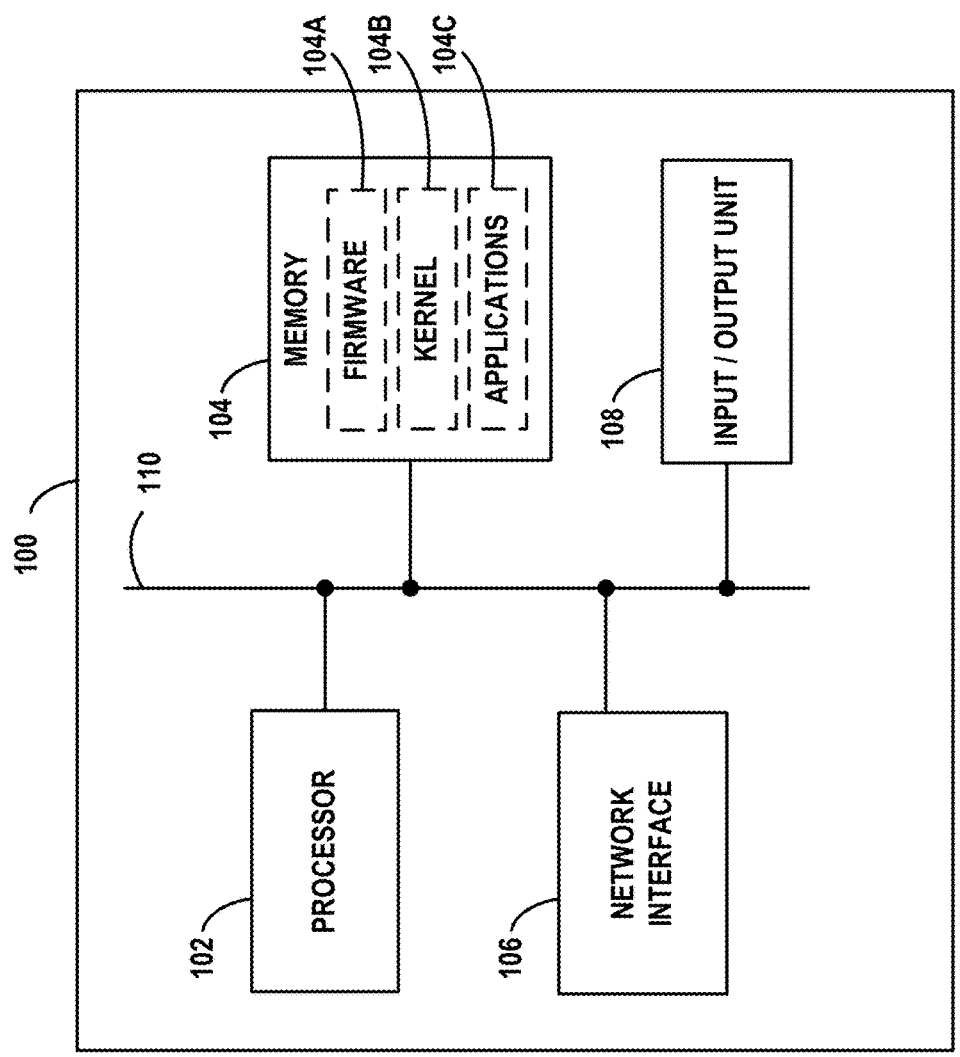
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
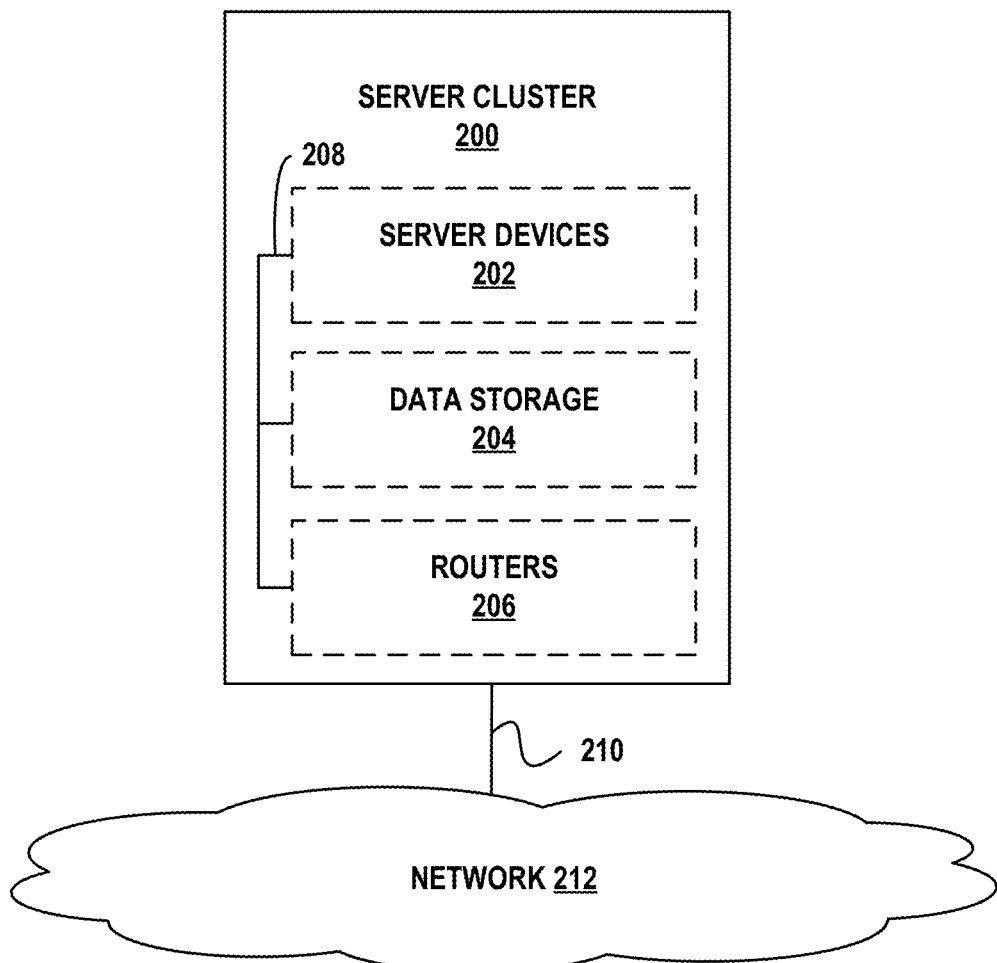
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
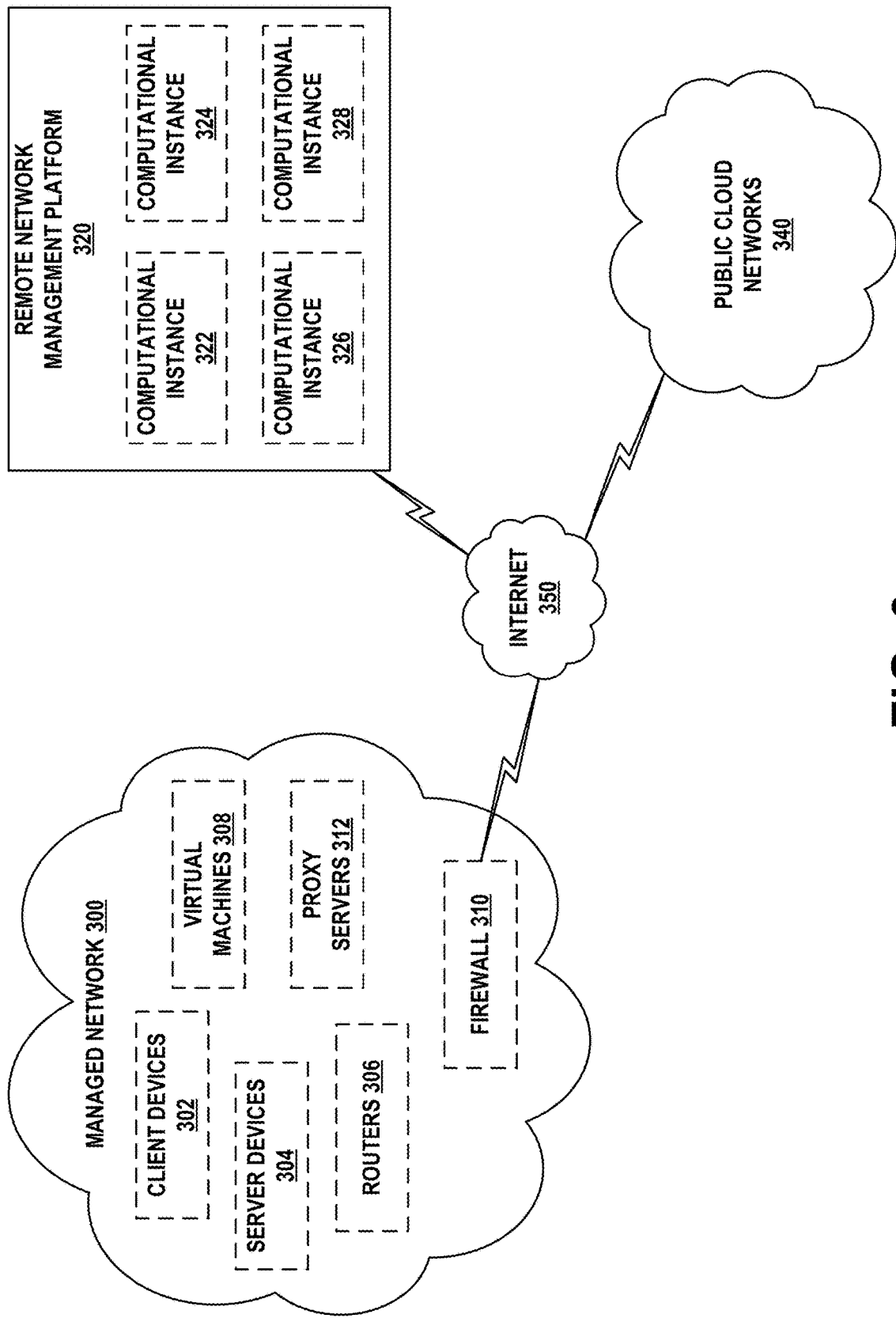
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
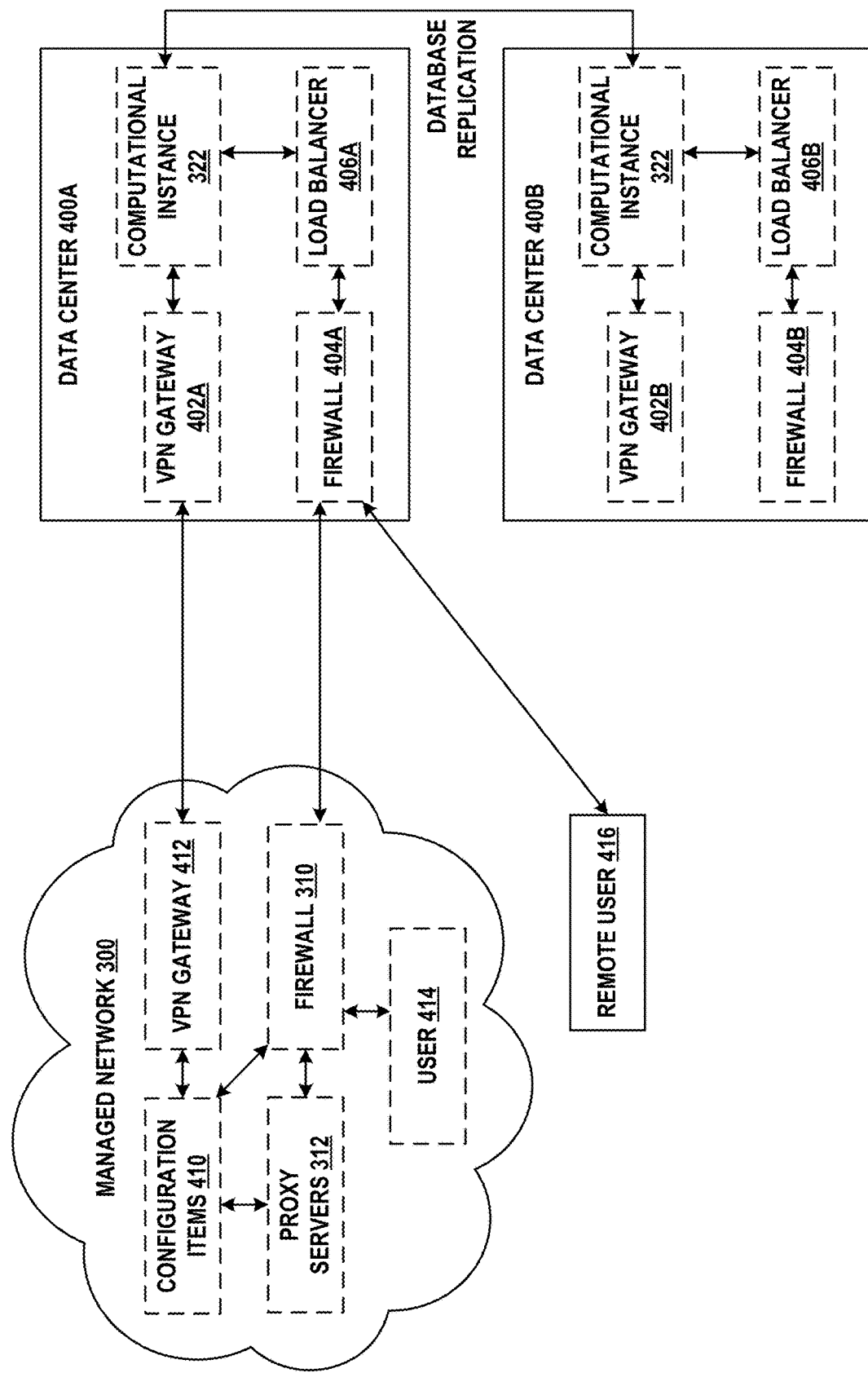
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
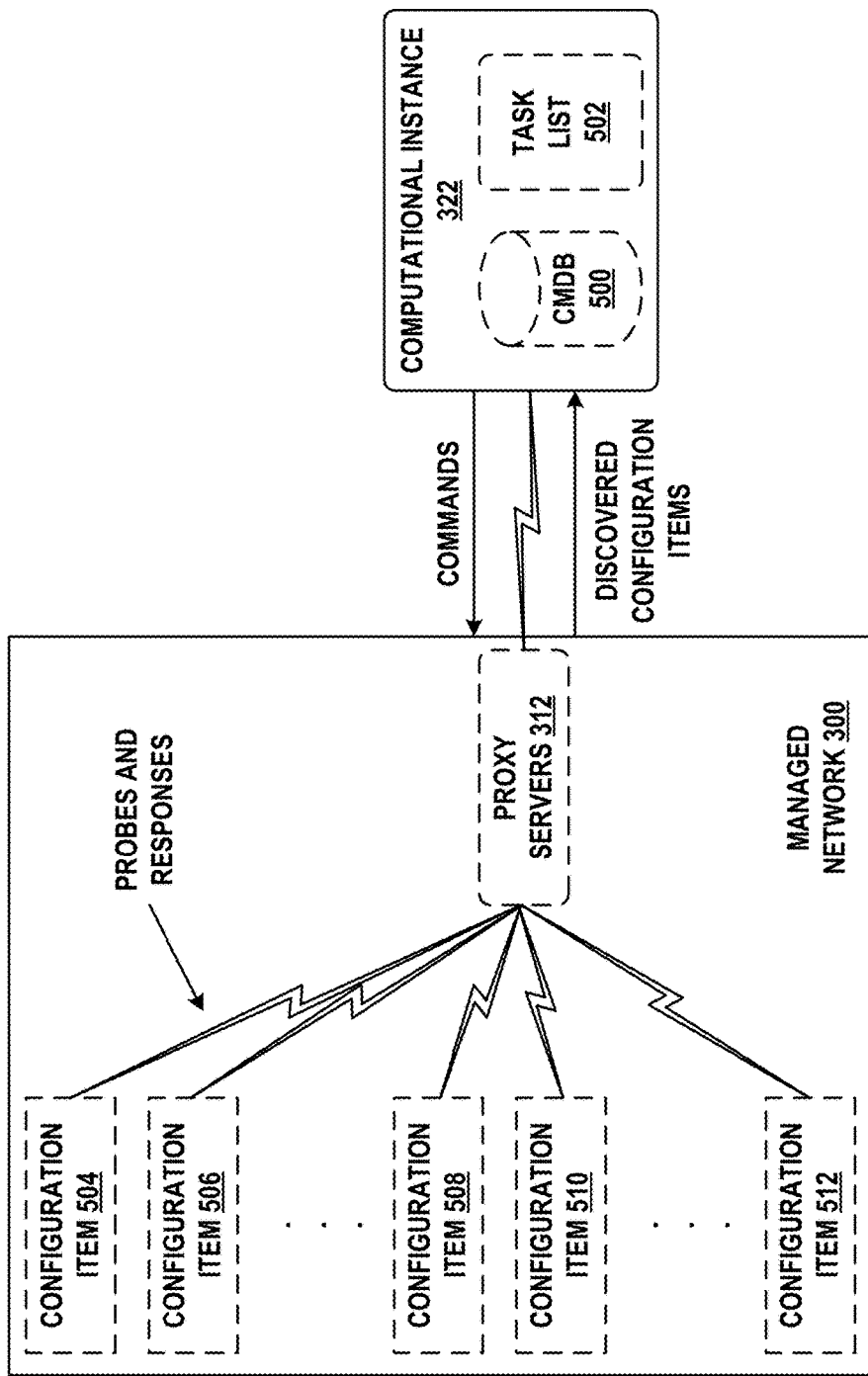
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
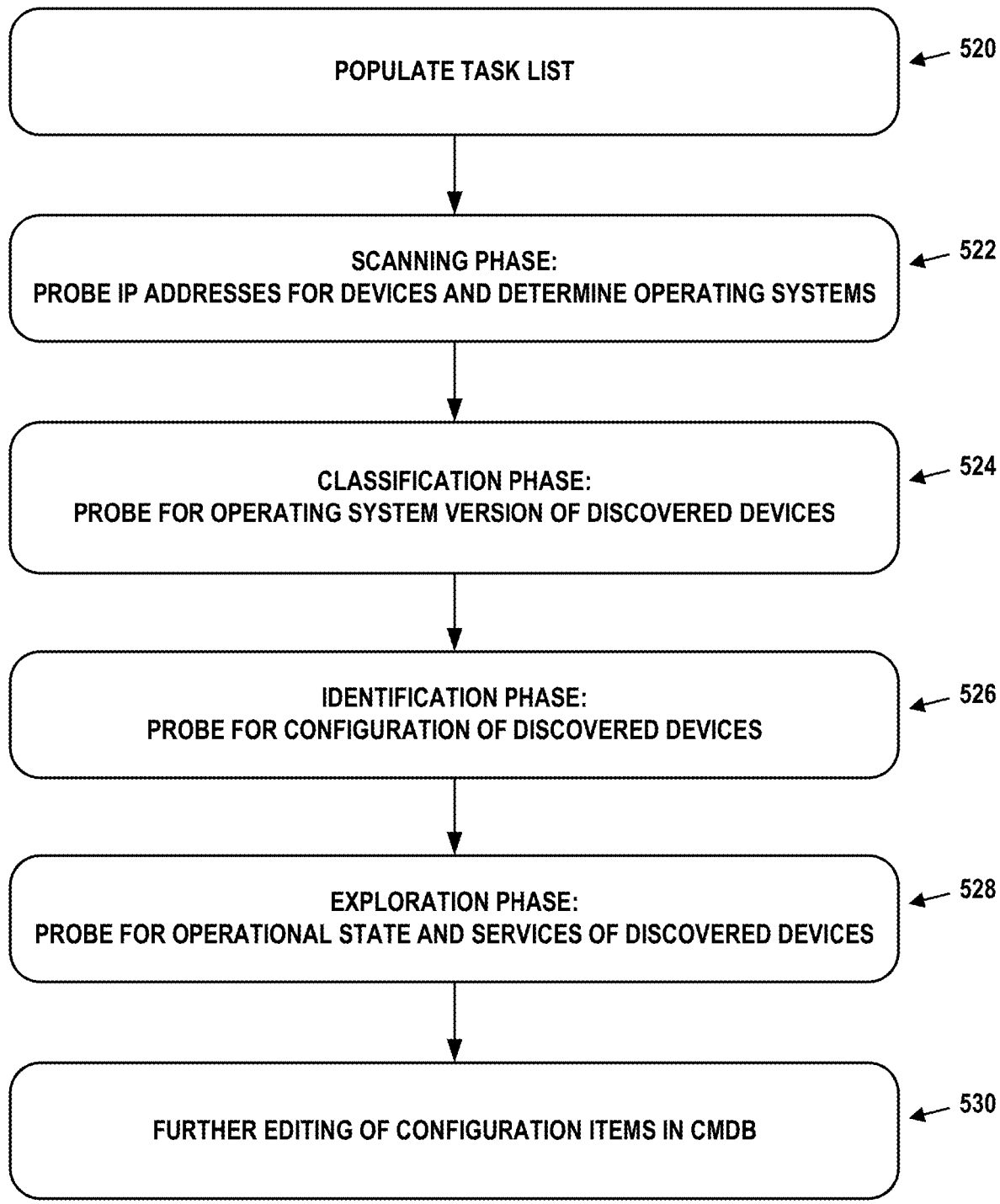
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE ARCHITECTURE

Figure 6:
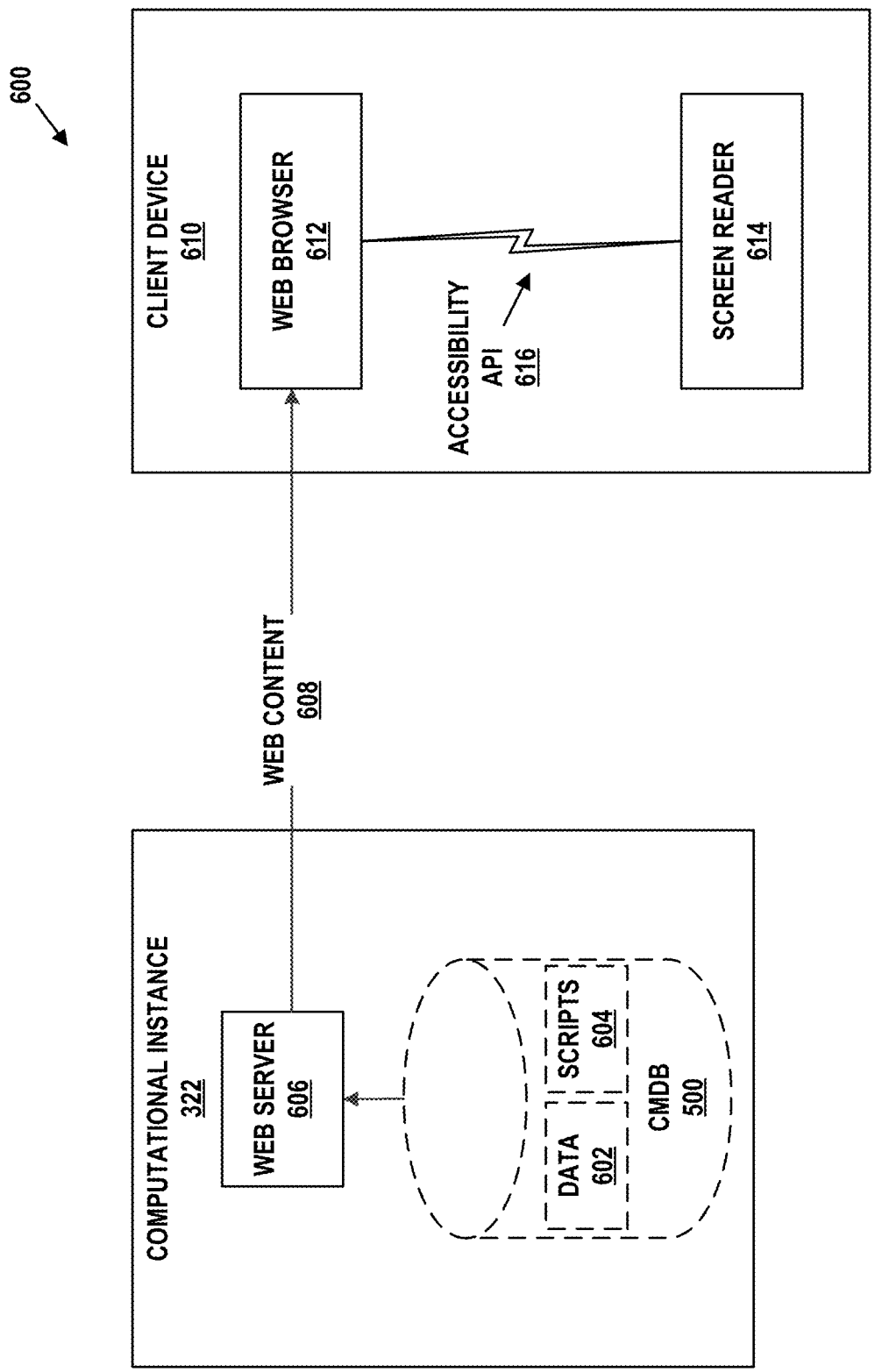
FIG. 6 depicts an architecture for providing web content from a computational instance to a web browser of a client device, in accordance with example embodiments.

FIG. 6 depicts architecture 600 for providing web content from a computational instance to a web browser of a client device. As shown in architecture 600, computational instance 322 and client device 610 may be in communication with each other. Architecture 600 is just one example of how web content can be delivered. Other possibilities exist.

As described above, computational instance 322 includes CMDB 500, and CMDB 500 may store data 602 and scripts 604. Data 602 may relate to configuration items disposed within a managed network, and scripts 604 may be executable program code configured to process data 602 or carry out other tasks.

Computational instance 322 may also include web server 606, configured to receive requests for web content and provide corresponding responses. These requests and responses may be in accordance with the Hypertext Transfer Protocol (HTTP) or Secure HTTP (HTTPS). Reception of such a request may cause web server 606 to retrieve information from CMDB 500, including units of data 602 and/or scripts 604.

Scripts 604 may be server-side scripts executable by web server 606 to generate web content 608 from data 602. In some cases, scripts 604 may include compiled or interpreted programs. Web content 608 may be in the form of markup language, such as HTML or XML. Web content 608 may also include client-side scripts (such as JAVASCRIPT®), and/or mechanisms (such as AJAX) through which content can be dynamically requested and received from web server 606. Once web content 608 is generated, web server 606 may transmit it to client device 610.

Web content 608 may be represented in memory in the form of a document object model (DOM). The DOM is a tree-like structure that defines the hierarchy of the markup language. Most examples of web content in markup language, such as HTML or XML, may have a one-to-one mapping to a DOM structure. For example, each node of the DOM may represent an HTML tag, with child nodes representing child tags nested within tags of their respective parent nodes.

Client device 610 may include web browser 612 and screen reader 614 among other applications. Web browser 612 may be a software application configured to request, receive, and display web content 608 on client device 610 in the form of web pages. Web browser 612 may also be configured to facilitate navigation between web pages as well as transmit requests for additional or different content to be provided within a displayed web page. Thus, the appearance of the web page may change as the user interacts with the web page and/or web browser 612.

On its own, web browser 612 may be able to meet the needs of sighted users, but visually impaired users may find it difficult or impossible to use effectively. Particularly, utilizing a web browser may involve hovering a pointer over information on a web page or selecting such information with the pointer or a combination of keystrokes. A visually impaired user may, without assistive technology, be unable to determine the information that is selected or be able to successfully navigate web pages displayed on web browser 612.

In order to overcome these limitations, screen reader software applications, such as screen reader 614, can be employed. When used with web browser 612, screen reader 614 may synthesize speech that represents web content 608. In some cases, screen reader 614 may be a general purpose screen reader associated with the operating system on which it is installed and/or executable. For example, a client device executing a WINDOWS® operating system may use MICROSOFT® Narrator or another screen reader developed for a WINDOWS® operating system, such as NVDA®. In other cases, the screen reader 614 may not be directly associated with the operating system itself, but instead take the form of an application. For example, a client device executing a UNIX® operating system, such as an UBUNTU® distribution of LINUX®, could be using the GNOME® desktop environment, which may use Orca as a screen reader. Other screen readers are also possible.

Screen reader 614 may be able to interpret information from a variety of applications executing on the operating system through intercepting messages from the operating system and/or using an Accessibility Application Programming Interface (API), such as Accessibility API 616. Accessibility API 616 may be used to access information about executing applications, including but not limited to the type, properties, values, and states of objects that are being displayed on the user interface. Accessibility API 616 may be specific to a particular operating system and/or application. For example, a computer executing a WINDOWS® operating system may have a screen reader using MICROSOFT® Active Accessibility. A computer executing a UNIX® operating system, such as LINUX®, may utilize the Assistive Technology Service Provider Interface.

In the case of web browsers, a screen reader, such as screen reader 614, may have access to the DOM of a web page though Accessibility API 616. Events may be generated by screen reader 614 using the Accessibility API 616 to request information from web browser 612 or to change aspects of the DOM. Web browser 612 may be integrated with operating system specific Accessibility API 616 and may respond to such events. Additionally, upon user input, web browser 612 may generate one or more events of the Accessibility API 616 to be received by screen reader 614. Events generated by screen reader 614 may include requests for information regarding certain nodes of the DOM. Events generated by web browser 612 to screen reader 614 may include information from attributes in the DOM.

For example, a user may press a key or use a voice command to change the focus from a first text field to a second text field on a web page in web browser 612. Web browser 612 may subsequently generate a "focus" event in accordance with the Accessibility API 616 of the operating system. Screen reader 614 may listen to the event and declare the value of the text field. In another example, one or more events may be generated when a part of the DOM is altered. Such events may be accompanied by one or more additional attributes of the altered part, e.g. to specify if the part was active when altered.

In one example, web browser 612 may store an outline of the web page according to the DOM of the web page. Screen readers may use the Accessibility API 616 to navigate the outline for an auditory representation of the web page. Attributes of each node on the outline may change in accordance to changes in the DOM.

In general, screen readers may interpret information on a screen linearly using the outline of the web page. As such, the organization of such a web page may be important to convey information to the user in an understandable fashion, particularly in the case of visual user interface elements such as relational charts. These relational charts may include, for example, bar charts, pie charts, line charts, histograms, scatter plots, and so on.

For at least some types of relational charts, it is advantageous to organize the DOM in a fashion that groups the symbol segments within each symbol of the chart. For example, in a bar chart, it may be beneficial to group the definitions of bar segments as respective children of the bar in which they appear. Likewise, in a pie chart, it may be beneficial to group definitions each radial segment (e.g., defining a "slice" of the pie with one or more angles and a magnitude) as a respective child of the pie chart. Similarly, in a line chart, it may be beneficial to group definitions points as respective children of the line in which they appear.

The description below focuses on bar charts for sake of illustration. The described embodiments, however, can be adapted to various additional types of charts, notably pie charts and line charts.

VI. BAR CHARTS

Figure 7:
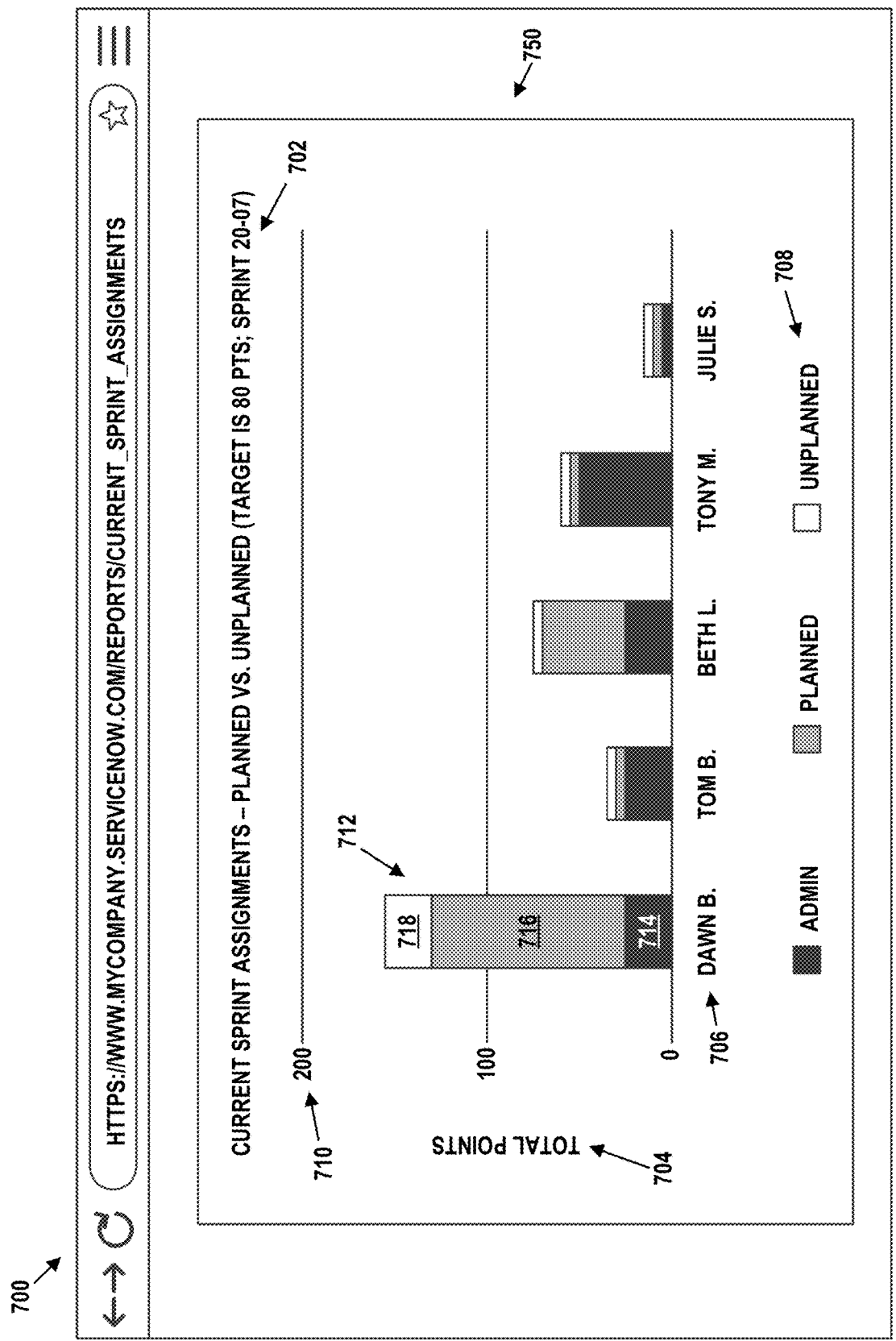
FIG. 7 depicts an example bar chart displayed on a web page of a web browser, in accordance with example embodiments.

As mentioned above, a bar chart is a data visualization technique that uses rectangular bars with sizes proportional to the relative values of the data that they represent. Bar charts may facilitate rapid visual comparison of multiple points or sets of data. FIG. 7 depicts an example of a bar chart 750 displayed on web page 700 of a web browser, such as web browser 612. Other examples are also possible.

Bar chart 750 may have several components. A summary of bar chart 750 may be depicted in the form of title 702. Bars, such as bar 712, represent the values of the data being visualized. Data may be depicted by plotting bars, such as bar 712, on two axes, the x-axis and the y-axis. The x-axis runs horizontally across the chart. In this case, the x-axis has x-axis labels 706 which describe the respective bars. For instance, bar 712 containing bar segments 714, 716, and 718 are described by the corresponding x-axis label 706 as being attributed to "Dawn B." In a similar manner, the y-axis runs vertically down the chart. The y-axis may have values representing the y-axis scale, such as y-axis scale labels 710. In this case, the values of y-axis scale labels 710 represent the magnitude of the data with y-axis label 704. For instance, a user may notice that bar 712 ends about midway between y-axis scale labels 710. Accordingly, y-axis scale labels 710 and y-axis label 704 may be used to deduce that bar 712 has a height of 150 total points.

In this example, bar 712 may have multiple bar segments 714, 716, and 718 representing various categories. Each bar segment is associated with a category by color using key 708. The categories, in this case, are "admin," "planned," and "unplanned," but may vary depending on the data being depicted. The values of data represented by the bars, such as bar 712, and bar segments, such as bar segments 714, 716, and 718, may be visually estimated through using y-axis scale labels 710 and y-axis label 704.

For example, bar 712 depicts "total points" of "Dawn B." Bar segment 714 is depicted using a dark shade of grey which, by key 708, represents "admin." As such, it may be deduced by the user that bar segment 714 represents the points earned by "Dawn B." through admin assignments. Similarly, bar segment 716 is depicted using a medium shade of grey which, by key 708, represents "planned". Likewise, bar segment 718 is depicted using white which represents "unplanned." As such, it may be deduced by the user that bar segment 714 represents the points earned by "Dawn B." through planned assignments and bar segment 716 represents the points earned by "Dawn B." earned through unplanned assignments.

Using y-axis scale labels 710, a non-visually impaired user may be able to deduce that bar segment 714 is approximately one fifth of the way to the value 100 of y-axis scale label 710. Thus, bar segment 714 represents a value of approximately 20 "total points" of "Dawn. B." earned through admin assignments. Similar procedures may be applied to bar segments 716 and 718 to deduce the "total points" of "Dawn B." earned through planned assignments and unplanned assignments, respectively.

Similarly, the "total points" of "Dawn B." earned through categories admin, planning, and unplanned may be deduced from the sum of values of bar segments 714, 716, and 718. Further, the value may be deduced using the height of bar 712, approximately half way between 100 and 200 of y-axis label. As such, the "total points" of "Dawn B." is approximately 150 total points.

In general, the type of data, values that this data takes on, and how the data is presented in bar charts may vary substantially. For instance, the axes may be swapped such that bars, such as bar 712, are horizontal rather than vertical. Bars may have varying numbers of bar segments, from having one main bar to many bar segments. The number of categories, which may depend on the number of bar segments, may also vary, which key 708 being changed accordingly. The number of bars, such as bar 712, may also vary. Other elements of bar chart 750, such as title 702, x-axis label 706, y-axis label 704, and y-axis scale labels 710, may also take on different values and/or placements. Bar chart 750 is intended as an example, and not meant to be limiting.

The visual inferences described above to deduce the values represented by bars in a bar chart may be useful in summarizing information for a user who is not visually impaired. However, a visually impaired user may have significantly more difficulty. As such, it may be useful to use a screen reader, such as screen reader 614, to navigate bar chart 750 on web page 700 in web browser 612.

As mentioned above, however, screen readers may have difficulty navigating and conveying a bar chart, such as bar chart 750, in a logical way to a visually impaired user. For instance, the order in which screen readers represent information may depend on the hierarchy of the DOM and/or markup language from which bar chart 750 is generated. If the hierarchical structure of the resulting web page containing bar chart 750 does not contain sufficient information and is not organized in a way that is logical, a screen reader might not accurately depict bar chart 750 to a visually impaired user.

VII. REPRESENTATIONS OF BAR CHARTS

FIG. 8 depicts an example segment of XML code 800. When loaded by a web browser, XML, code 800 may cause the web browser to display a bar chart similar to bar chart 750, without title 702, y-axis label 704, y-axis scale labels 710, or key 708. Other examples are also possible. XML code 800 may exist in a standalone fashion or may be integrated into the markup language representation of a web page.

Lines that commence with "<?" and end with "?>," such as lines 1 and 2, depict processing instructions. In some cases, XML code 800 may commence with a prolog, as shown on line 1, which declares the details of the XML document, such as the type and the encoding. In XML code 800, the version of XML used is "1.0" and encoding is "utf-8." The prolog on line 1 is followed by processing instructions on line 2 specifying the style sheet document. The style sheet document, in this case "test.css," may be a document outlining the styles of elements in XML code 800. Cascading Style Sheet (CSS) or other style sheet languages may be used. Other processing instructions are also possible.

Lines 3 through 32 depict elements of the bar chart. Each element may have starting and ending tags. Starting tags are typically surrounded by "<" and ">", and ending tags are typically surrounded by "</" and ">". For example, the "svg" block has a starting tag on line 3 and an ending tag on line 33. The first "g" element block has a starting tag on line 4 and an ending tag on line 10. Single line elements may be surrounded by "<" and "/>." Line 5 is an example of a single line element.

Elements may be nested in a block termed as the parent. For example, the first "g" block starting on line 4 is a child of the "svg" block starting on line 3. Thus, the "g" block may be termed as the child of the "svg" block. Blocks with the same parent may be called siblings.

The general use of elements may be defined in advance by the developers of the language. For instance, the World Wide Web Consortium (W3C) develops and maintains XML. The XML element "svg" may be defined as depicting vector graphics that are two-dimensional. The "g" tag may be used as a container to group elements within the "svg" tag. The "rect" element may be a basic shape used to depict rectangles. Elements may likewise have predefined properties. For instance, "rect" elements may have a default color of black.

Elements may also have properties defined in accordance with the application, specified using attributes. For instance, the "rect" element on line 5 has a width attribute value of 50 and a height attribute value of 25 which define the width and the height of the element, respectively. The "style" attribute may specify various styles of the element. In this case, the style attribute specifies the filling color of the rectangle using the rgb( ) function. The rgb( ) function may take three integer values ranging from 0 to 255 as an input, where the first describing the intensity of red, the second describing the intensity of green, and the third describing the intensity of blue. A larger integer may indicate a higher intensity. For instance, line 5 describes the intensity of red as 255 and the intensity of green and blue as 0. As such, the color of the rectangle described on line 5 is red. Other functions and color descriptors may be used to assign colors to an element. Additionally, other attributes, e.g. the x and y attributes, may specify the position of the element. Additional attributes may also be specified.

Accessible Rich Internet Applications (ARIA) may define set attributes that may be used to make web content more accessible. The "aria-label" attribute present in many of the lines, for instance line 5, may describe the text that screen reader 614 reads. In many cases, screen reader 614 may read the "aria-label" attribute value directly with punctuation, depending on the verbosity settings of screen reader 614. Another possible aria attribute is aria-hidden, such as in line 25. The aria-hidden attribute may be used when the element is decorative and/or does not need to be conveyed in an auditory manner.

XML code 800, when displayed on a web browser, may depict a bar chart. Each "rect" element is representative of a bar segment, such as bar segment 714 in FIG. 7. In this case, XML code 800 is organized such that each category is under one "g" tag and category members are siblings. More specifically, rectangles defined in lines 5-9 are bar segments in the admin category, such as bar segment 714. Rectangles defined in lines 12-16 correspond to bar segments in the planned category, such as bar segment 716. Rectangles defined in lines 19-23 correspond to bar segments in the unplanned category, such as bar segment 718. This organization of the bars may be termed as being organized horizontally.

As mentioned above, screen readers in general may interpret information on a screen linearly using the outline of the web page. In the case of XML code 800, screen reader 614 may navigate the web page in the order the elements are presented in XML code 800. For instance, screen reader 614 may convey the value of the category, e.g. in line 4 "Admin, bar series 1 of 3 with 5 bars," then convey the values of aria-label attributes of rectangles, e.g. in line 5.

In many cases, the aria-label attributes may be automatically generated from information (e.g., metadata) provided from a database. From this example, it may be seen that the aria-labels may provide minimal value to the user. Although the values of each category may be compared, values for individual bars have difficulty being conveyed and the plot as a whole may be difficult to summarize. Typically, a screen reader may traverse the web page linearly. For instance, screen reader 614 may first announce the aria label of line 4, then line 5, and so on. The user may hear "Admin, bar series 1 of 3 with 5 bars," subsequently "1. Admin, 25 (16.67%)," and so on. Such a depiction may not be effective in conveying information from bar chart 750 and may be difficult for the user to understand.

Put another way, the organizational structure of the bar chart is a collection of horizontal bands. So, as a user goes through the chart by way of a screen reader, the chart appears to be a collection of isolated images with numbers and metadata attached. While the screen reader can read out the numbers and metadata, these numbers and metadata may just be data and/or words without the context needed to make them useful information. In order for the comparisons to be useful, one may need to remember which person was represented in what position on the horizontal axis and perhaps other information; a huge cognitive load that makes the user interface generated from XML, code 800 quite difficult to use. Particularly, this user interface does not give someone using a screen reader the equivalent information to what is available visually.

FIG. 9 depicts an example segment of XML code 900, which is organized in a different manner than XML code 800. This allows a user interface generated from XML code 900 to be more conducive for use with a screen reader.

Processing instructions on lines 1-2 of XML code 900 may be in the same form as XML code 800. Additionally, the "rect" tags of XML code 800 and XML code 900 may be of the same form.

XML code 900 differs from XML code 800 in the organization of elements. Each "g" element contains bar segments belonging to that particular bar. For instance, lines 4-8 depict a full bar on a bar chart, such as bar 712. Similarly, line 5 depicts bar segment 714, line 6 depicts bar segment 716, line 7 depicts bar segment 718, and so on. As such, XML code 900 may be termed as being organized vertically per bar, as opposed to horizontally per bar such as in XML code 800.

Screen reader 614 may parse the bar chart in XML code 900 in a more logical way than the bar chart depicted in XML code 800. Screen reader 614 may linearly traverse XML code 900, conveying values of aria-label attributes to the user. In the case of XML code 900, screen reader 614 may first describe the bar, e.g. "Dawn B, Total=150 (100%)," then describe each of the bar segments. Such a portrayal of the information may be easier for the user to understand than the portrayal of XML code 800, as described above. Notably, all data related to one bar is represented in child elements of that bar. This dramatically reduces the cognitive load for visually-impaired users or anyone using a screen reader to interact with the bar chart.

XML code 900 may also have advantages in the case of an NLU interface, which may have user input. For instance, a screen reader navigating XML code 900 may be able to find the answer to user questions such as "What is Dawn B.'s total?" easier than a screen reader navigating XML code 800. Additionally, XML code 900 is organized in such a way that may facilitate answering more typical questions, such as "How does Dawn B.'s total compare to Tom B.'s?" Such questions may be difficult for a screen reader navigating XML code 800 to answer.

For purposes of the embodiments herein, a screen reader navigating XML code 800 or XML code 900 may be navigating a representation of web page 700. The web content of web page 700 may incorporate XML code 800 or 900. The representation of a web page may be in the form of a DOM.

VIII. GENERATING RELATIONAL CHARTS TO FACILITATE SCREEN READERS

Figure 10:
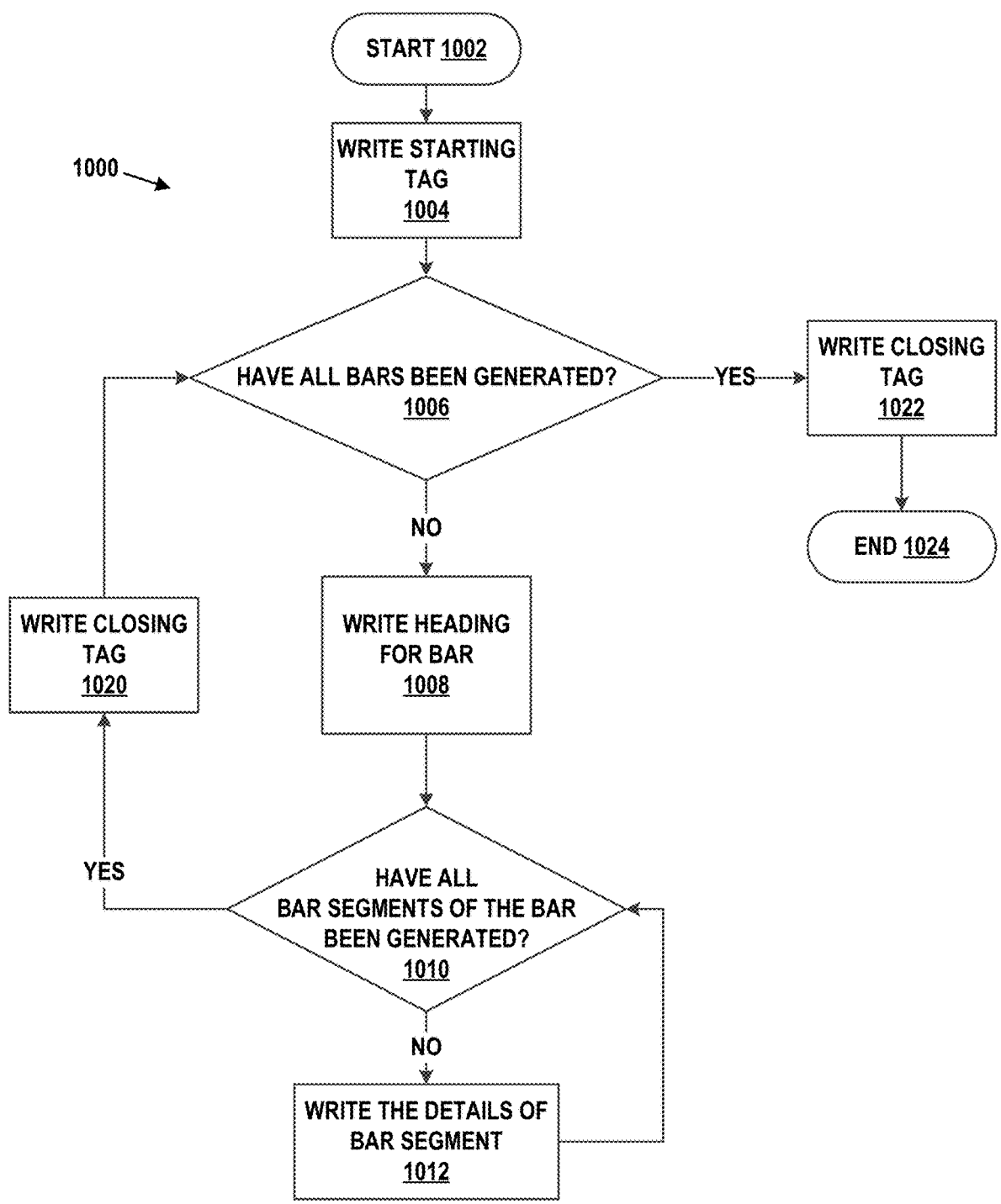
FIG. 10 is a flow chart depicting steps to generate XML code, in accordance with example embodiments.

As mentioned above, web content 608, such as XML code 800 and XML code 900, may be generated using scripts 604 from CMDB 500. FIG. 10 depicts one method, through flow chart 1000, which may be used by scripts 604 to generate web content 608 in the form of XML code 900.

Since the description below uses XML code 900, it necessarily focuses on the bar chart embodiment. But, as noted above, this embodiment can be adapted to various additional types of charts, notably pie charts and line charts. Suggestions of how to do so appear from time to time in this description.

Before start block 1002, processing instructions, such as lines 1 and 2 of XML code 900, may have been defined in the same file or a different file. Other web content may also have been defined previous to start block 1002.

Scripts 604 may commence at start block 1002 with a data structure of values. Data 602 may be loaded into a data structure that can temporarily hold data. For instance, the data structure may be a two dimensional array. The first dimension of a two dimensional array may be a list of values or tuples (e.g. the lengths of a bar segment of a bar chart, the angles and magnitude of a radial segment of a pie chart, the coordinates of a point on a line chart). The second dimension of a two dimensional array may be a list of the previously mentioned one dimensional arrays. Other data structures are also possible.

Following start block 1002, script 604 may generate a starting tag for an element containing bar chart 750 as in block 1004. One such starting tag may be line 3 of XML code 900, i.e., the tag for the "svg" block. The starting tag may be appended to previously generated XML code.

Following block 1004, script 604 may check if all the bars (or pies or lines) have been made in block 1006. For an array, this may comprise determining if the loop has been iterated through more times than the number of elements in the array. Other data structures may check if all the bars have been made in various other ways.

If not all bars have been made, then script 604 may proceed to write a heading for the next bar in block 1008. This heading may include information from the array or other data structure as well as data from a database. For instance, script 604 at this block may output line 4 of XML code 900. This generated heading may be appended to previously generated XML code.

After the heading for the bar is made, script 604 may move on to block 1010 to determine if all segments of the bar (or pie or line) have been made. If not, script 604 may proceed to writing the details of the entry in block 1012. Similar to block 1006, this may include information from a data structure as well as data from a database. For instance, script 604 at this block may output line 5 of XML code 900.

Steps in the previous paragraph may be repeated until all the segments of the bar (or pie or line) have been made. Script 604 may then proceed to block 1020, writing the closing tag for heading tag generated in block 1008. An example may be line 8 in XML code 900.

Subsequently, script 604 may proceed to block 1006 to determine if all such bars (or pies or lines) have been made. If not, the above mentioned process starting with block 1006 may be repeated until all the bars have been made. After all bars have been made, script 604 may proceed to block 1022 to write a closing tag corresponding to the starting tag generated in block 1004. An example may be line 37 in XML code 900.

After block 1022, the script may proceed to block 1024. At block 1024, script 604 may finish generating web content for the bar chart. After block 1024, web content 608 may be complete and the script may end. However, additional web content may be written by the same script or another script. For instance, web content may include closing tags for web content defined prior to start block 1002. Other web content are also possible.

Although the above disclosure discusses generating markup language representing a bar chart, other examples are also possible. A bar chart may be just one example of a relational chart, a bar in a bar chart may be one example of a symbol in a relational chart, and bar segments of a bar may be one example of symbol segments of a symbol. Aspects of the above disclosure may thus be applied to a range of relational charts.

In one case, a relational chart may be a pie chart. Pie charts may be a method of visualizing data that displays data values in relation to one another as slices, or radial segments, of the pie chart. In this particular case, the one or more symbols may consist of a single symbol representing the pie chart and the symbol segments, e.g. the radial segments, may belong to the single symbol.

In another case, a relational chart may be a line chart. Line charts may be a method of visualizing data that displays categories of data values as points on a chart. Each point may be connected by a line to the next respective point in the same category. In this particular case, the one or more symbols may be lines of the bar chart and the symbol segments for each of the lines are points respectively defining the lines.

The above disclosure of the types of relational charts are intended as examples and not meant to be limiting. Markup language representing other types of relational charts may also be generated from the general process described in flow chart 1000, where a bar is an example of a symbol in a relational chart and bar segments of the bar may be one example of symbol segments of a symbol.

IX. EXAMPLE OPERATIONS

Figure 11:
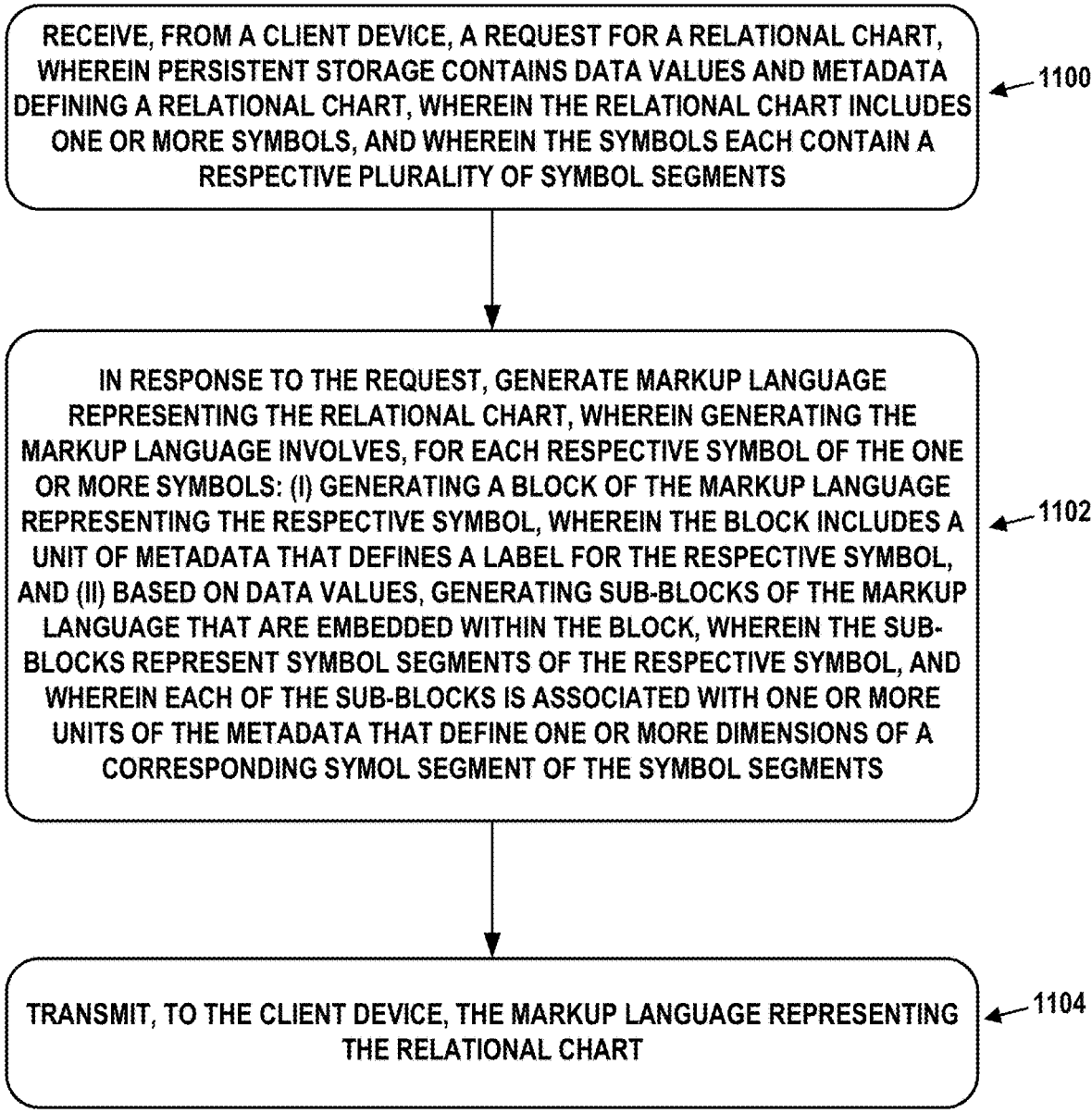
FIG. 11 is a further flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve receiving, from a client device, a request for a relational chart, wherein persistent storage contains data values and metadata defining the relational chart, wherein the relational chart includes one or more symbols, and wherein the symbols each contain a respective plurality of symbol segments.

Block 1102 may involve, possibly in response to the request, generating markup language representing the relational chart, wherein generating the markup language involves, for each respective symbol of the one or more symbols: (i) generating a block of the markup language representing the respective symbol, wherein the block includes a unit of the metadata that defines a label for the respective symbol, and (ii) based on the data values, generating sub-blocks of the markup language that are embedded within the block, wherein the sub-blocks represent symbol segments of the respective symbol, and wherein each of the sub-blocks is associated with one or more units of the metadata that define one or more dimensions of a corresponding symbol segment of the symbol segments.

Block 1104 may involve transmitting, to the client device, the markup language representing the relational chart.

In some embodiments, the request may indicate that it is on behalf of a visually-impaired user, and wherein the request being on behalf of the visually-impaired user causes the sub-blocks representing symbol segments to be generated within the block of the markup language representing the respective symbol.

In some embodiments, the markup language representing the relational chart may be embedded within a web page that is transmitted to the client device.

In some embodiments, the relational chart may be a bar chart, wherein the one or more symbols are bars of the bar chart, and wherein the respective plurality of symbol segments for each of the bars are bar segments. In these embodiments, the one or more units of the metadata that define one or more dimensions of each of the bar segments may include an x-dimension and a y-dimension of the bar segments. These embodiments may further involve the one or more units of the metadata also defining a position of each of the bar segments on an x-y coordinate plane.

In some embodiments, the relational chart is a pie chart, wherein the one or more symbols consist of a single symbol representing the pie chart, and wherein the respective plurality of symbol segments for the single symbol are radial segments of the pie chart.

In some embodiments, the relational chart is a line chart, wherein the one or more symbols are lines of the line chart, and wherein the respective plurality of symbol segments for each of the lines are points respectively defining the lines.

In some embodiments, the one or more units of the metadata also define one or more of colors, textures, or patterns of the corresponding symbol segment.

In some embodiments, the symbols and symbol segments are associated with textual labels, and wherein each textual label of the textual labels, when accessed, causes a screen reader of the client device to output an audio representation of the textual label.

In some embodiments, one or more units of the metadata are disposed within a stylesheet that is separate from the markup language.

In some embodiments, the one or more units of the metadata are represented by the markup language.

X. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing data values and metadata defining a bar chart, wherein the bar chart includes one or more bars of the bar chart, and wherein the bars each contain one or more bar segments; and
   one or more processors configured to:
      receive, from a client device, a request for the bar chart;
      in response to the request, generate markup language representing the bar chart, wherein generating the markup language involves, for each respective bar of the one or more bars:

(i) generating a block of the markup language representing the respective bar, and
(ii) based on the data values, generating sub-blocks of the markup language that are embedded within the block, wherein the sub-blocks represent bar segments of the respective bar, and wherein each of the sub-blocks is associated with one or more units of the metadata that define one or more textual labels and one or more dimensions of a viewable layout for a corresponding bar segment; and transmit, to the client device, the markup language representing the bar chart, wherein the markup language is usable to render the bar chart on a user interface, wherein a respective textual label of the one or more textual labels, when accessed, causes a screen reader of the client device to output speech that represents the respective textual label.

2. The system of claim 1, wherein the request indicates it is on behalf of a visually-impaired user, and wherein the request being on behalf of the visually-impaired user causes the sub-blocks representing bar segments to be generated within the block of the markup language representing the respective bar.

3. The system of claim 1, wherein the markup language representing the bar chart is embedded within a web page that is transmitted to the client device.

4. The system of claim 1, wherein the one or more units of the metadata that define the one or more dimensions of each of the bar segments includes an x-dimension and a y-dimension of the bar segments.

5. The system of claim 1, wherein the one or more units of the metadata also define a position of each of the bar segments on an x-y coordinate plane.

6. The system of claim 1, wherein the one or more units of the metadata also define one or more of colors, textures, or patterns of the corresponding bar segment.

7. The system of claim 1, wherein the one or more units of the metadata are disposed within a stylesheet that is separate from the markup language.

8. The system of claim 1, wherein the one or more units of the metadata are represented by the markup language.

9. A computer-implemented method comprising:
receiving, from a client device, a request for a bar chart, wherein persistent storage contains data values and metadata defining the bar chart, wherein the bar chart includes one or more bars of the bar chart, and wherein the bars each contain one or more bar segments;
in response to the request, generating markup language representing the bar chart, wherein generating the markup language involves, for each respective bar of the one or more bars:
(i) generating a block of the markup language representing the respective bar, and
(ii) based on the data values, generating sub-blocks of the markup language that are embedded within the block, wherein the sub-blocks represent bar segments of the respective bar, and wherein each of the sub-blocks is associated with one or more units of the metadata that define one or more textual labels and one or more dimensions of a viewable layout for a corresponding bar segment; and transmitting, to the client device, the markup language representing the bar chart, wherein the markup language is usable to render the bar chart on a user interface, wherein a respective textual label of the one or more textual labels, when accessed, causes a screen reader of the client device to output speech that represents the respective textual label.

10. The computer-implemented method of claim 9, wherein the request indicates it is on behalf of a visually-impaired user, and wherein the request being on behalf of the visually-impaired user causes the sub-blocks representing bar segments to be generated within the block of the markup language representing the respective bar.

11. The computer-implemented method of claim 9, wherein the markup language representing the bar chart is embedded within a web page that is transmitted to the client device.

12. The computer-implemented method of claim 9, wherein the one or more units of the metadata also define one or more of colors, textures, or patterns of the corresponding bar segment.

13. The computer-implemented method of claim 9, wherein the one or more units of the metadata are disposed within a stylesheet that is separate from the markup language.

14. The computer-implemented method of claim 9, wherein the one or more units of the metadata are represented by the markup language.

15. An article of manufacture including a non-transitory computer-readable medium, having stored thereon program instructions that, upon execution by a computing system, cause the computing system to perform operations comprising:
receiving, from a client device, a request for a bar chart, wherein persistent storage contains data values and metadata defining the bar chart, wherein the bar chart includes one or more bars of the bar chart, and wherein the bars each contain one or more bar segments;
in response to the request, markup language representing the bar chart, wherein generating the markup language involves, for each respective bar of the one or more bars:
(i) generating a block of the markup language representing the respective bar, and
(ii) based on the data values, generating sub-blocks of the markup language that are embedded within the block, wherein the sub-blocks represent bar segments of the respective bar, and wherein each of the sub-blocks is associated with one or more units of the metadata that define one or more textual labels and one or more dimensions of a viewable layout for a corresponding bar segment; and
transmitting, to the client device, the markup language representing the bar chart, wherein the markup language is usable to render the bar chart on a user interface, wherein a respective textual label of the one or more textual labels, when accessed, causes a screen reader of the client device to output speech that represents the respective textual label.

* * * * *